(12) United States Patent
Sauvesty

(10) Patent No.: US 12,552,136 B2
(45) Date of Patent: Feb. 17, 2026

(54) CLAMPED GLAZED UNIT AND PERIPHERAL SEAL THEREOF WITH A SHAPE THAT LIMITS THE PERIPHERAL SLIDING OF THE GLAZED UNIT SO AS TO GUARANTEE THAT IT DOES NOT COME LOOSE FROM ITS MOUNTING STRUCTURE

(71) Applicant: SAINT-GOBAIN GLASS FRANCE, Courbevoie (FR)

(72) Inventor: Jean-Charles Sauvesty, Sully sur Loire (FR)

(73) Assignee: SAINT-GOBAIN SULLY, Sully-sur-Loire (FR)

( * ) Notice: Subject to any disclaimer, the term of this patent is extended or adjusted under 35 U.S.C. 154(b) by 392 days.

(21) Appl. No.: 18/252,255

(22) PCT Filed: Nov. 9, 2021

(86) PCT No.: PCT/FR2021/051976
§ 371 (c)(1),
(2) Date: May 9, 2023

(87) PCT Pub. No.: WO2022/101574
PCT Pub. Date: May 19, 2022

(65) Prior Publication Data
US 2023/0415459 A1 Dec. 28, 2023

(30) Foreign Application Priority Data
Nov. 10, 2020 (FR) ...................................... 2011540

(51) Int. Cl.
*B32B 17/10* (2006.01)
*B64C 1/14* (2006.01)

(52) U.S. Cl.
CPC .. *B32B 17/10302* (2013.01); *B32B 17/10036* (2013.01); *B32B 17/10091* (2013.01);
(Continued)

(58) Field of Classification Search
CPC ........ B32B 17/10036; B32B 17/10091; B32B 17/10137; B32B 17/10302;
(Continued)

(56) References Cited

U.S. PATENT DOCUMENTS 2,293,656 A * 8/1942 Mcclain ................ B64C 1/1492
52/204.597
2,409,808 A * 10/1946 Sowle ................... B64C 1/1492
52/309.3
(Continued)

FOREIGN PATENT DOCUMENTS

WO WO 2004/011249 A1 2/2004

OTHER PUBLICATIONS

International Search Report as issued in International Patent Application No. PCT/FR2021/051976, dated Jan. 28, 2022.

*Primary Examiner* — James M Ference
(74) *Attorney, Agent, or Firm* — Pillsbury Winthrop Shaw Pittman LLP

(57) ABSTRACT

An assembly of a laminated glazed unit and the peripheral seal thereof, the laminated glazed unit including a transparent structural block, the peripheral seal having a first spacer part between the external surface of the structural block and a windowpane retainer, and a second spacer part between the internal surface of the structural block and the mounting structure, at least one of the contact surface between the first spacer part and the windowpane retainer and/or between the second spacer part and the mounting structure approaching the structural block, from the edge of the latter to the central part thereof; and the application of this assembly to a clamped glazed unit in the field of aeronautics or railways.

16 Claims, 2 Drawing Sheets

(52) U.S. Cl.
CPC .. *B32B 17/10137* (2013.01); *B32B 17/10568* (2013.01); *B32B 17/10752* (2013.01); *B32B 17/10761* (2013.01); *B32B 17/1077* (2013.01); *B32B 2605/10* (2013.01); *B32B 2605/18* (2013.01); *B64C 1/1492* (2013.01)

(58) Field of Classification Search
CPC ........ B32B 17/10568; B32B 17/10752; B32B 17/10761; B32B 17/1077; B64C 1/1492
USPC ...................................................... 52/204.5
See application file for complete search history.

(56) References Cited

U.S. PATENT DOCUMENTS

| | | | | |
|---|---|---|---|---|
| 2,497,957 | A * | 2/1950 | Pelley | E06B 3/6205 292/342 |
| 3,953,630 | A * | 4/1976 | Roberts | B32B 17/10302 428/81 |
| 4,857,376 | A * | 8/1989 | Von Reis | B32B 3/04 296/84.1 |
| 4,933,227 | A * | 6/1990 | Stewart | B64C 1/1492 52/204.593 |
| 4,960,631 | A * | 10/1990 | Walters | B32B 17/10302 428/424.4 |
| 6,569,787 | B1 * | 5/2003 | Snelling | B32B 17/10761 428/36.1 |
| 6,837,022 | B2 * | 1/2005 | Ito | B60J 1/001 52/204.593 |
| 8,286,915 | B2 * | 10/2012 | Depeige | B64C 1/1492 244/129.4 |
| 9,371,129 | B1 | 6/2016 | Smolinske et al. | |
| 9,415,854 | B2 * | 8/2016 | Yokoi | B60J 10/16 |
| 9,598,166 | B2 * | 3/2017 | Yokoi | B64C 1/1492 |
| 2003/0234322 | A1 * | 12/2003 | Bladt | B64C 1/1484 244/129.3 |
| 2004/0021334 | A1 * | 2/2004 | Blevins | B32B 17/10366 296/84.1 |
| 2007/0069080 | A1 * | 3/2007 | Rassaian | B64C 1/1484 244/129.3 |
| 2007/0194177 | A1 * | 8/2007 | Coak | B64C 1/1492 244/129.3 |
| 2008/0067288 | A1 * | 3/2008 | Eberth | B64C 1/1492 244/129.3 |
| 2008/0318011 | A1 * | 12/2008 | Chaussade | B32B 17/1077 428/210 |
| 2010/0020381 | A1 * | 1/2010 | Legois | B32B 17/1077 359/275 |
| 2010/0163676 | A1 * | 7/2010 | Burgunder | B64C 1/1492 29/402.08 |
| 2014/0363254 | A1 * | 12/2014 | Kondo | B64G 1/22 411/337 |
| 2016/0288382 | A1 * | 10/2016 | Smolinske | B29C 45/72 |
| 2020/0226308 | A1 * | 7/2020 | Sauvesty | G06F 30/20 |
| 2022/0250731 | A1 * | 8/2022 | Rouby | B32B 17/10788 |
| 2023/0415459 | A1 * | 12/2023 | Sauvesty | B32B 17/10137 |

\* cited by examiner

[Fig. 1]
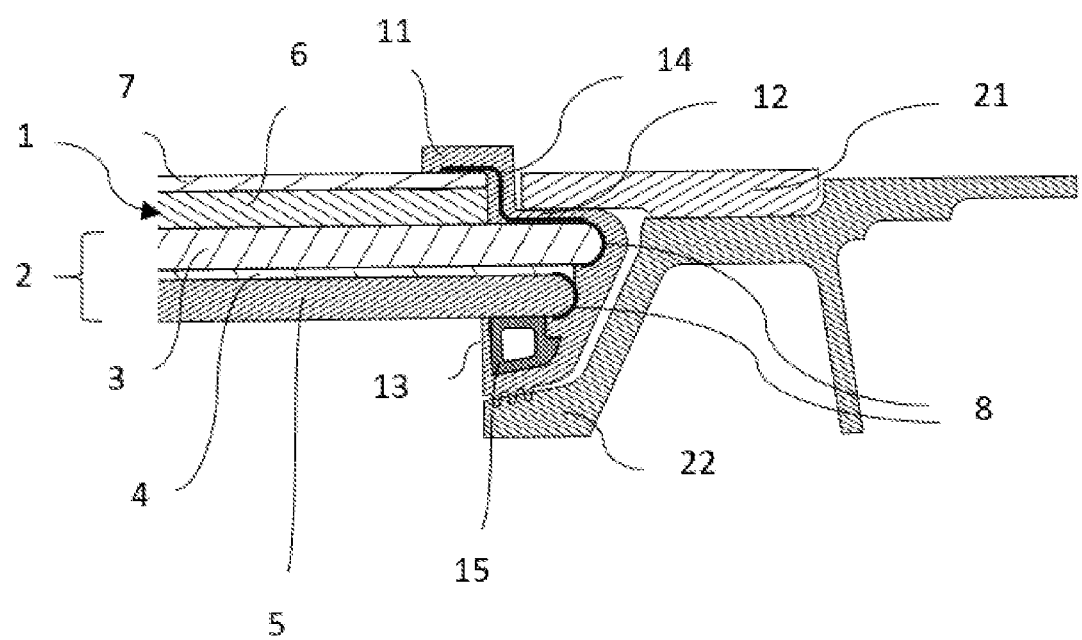
[Fig. 2]
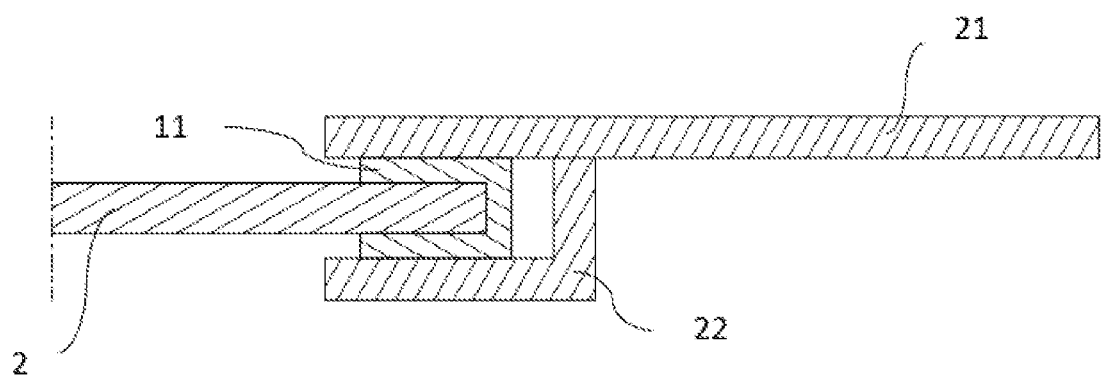

[Fig. 3]
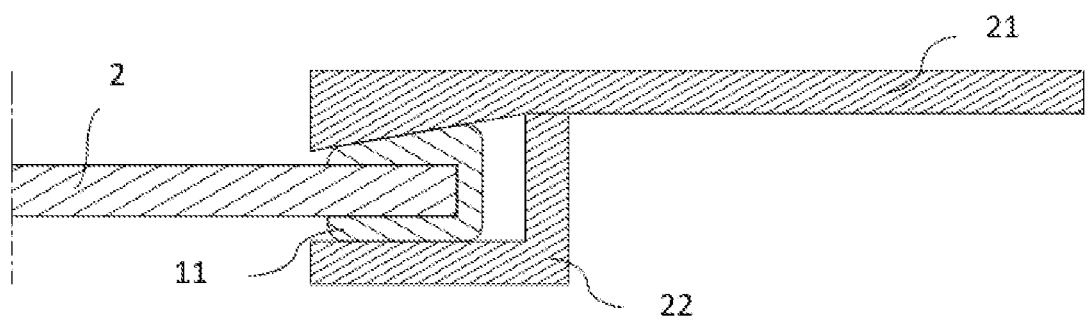
[Fig. 4]
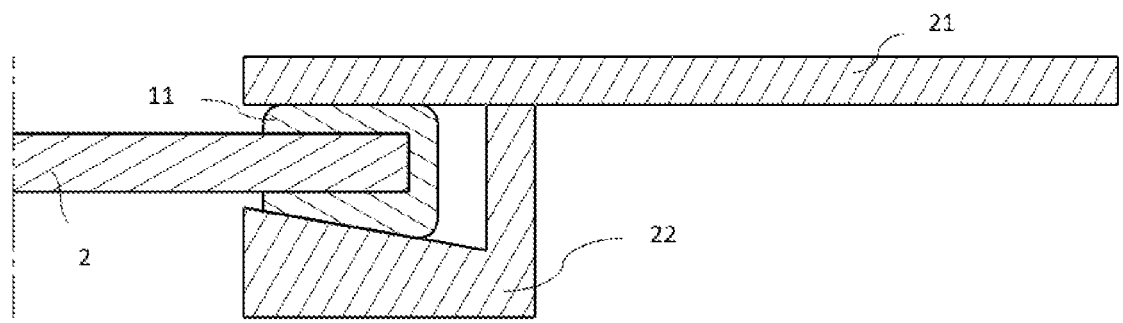
[Fig. 5]
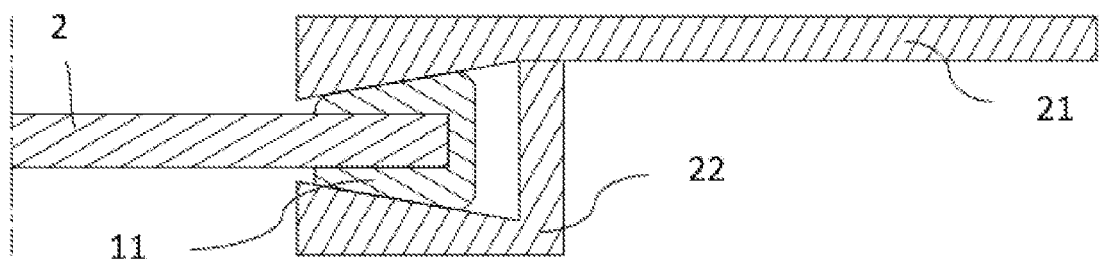

CLAMPED GLAZED UNIT AND PERIPHERAL SEAL THEREOF WITH A SHAPE THAT LIMITS THE PERIPHERAL SLIDING OF THE GLAZED UNIT SO AS TO GUARANTEE THAT IT DOES NOT COME LOOSE FROM ITS MOUNTING STRUCTURE

CROSS-REFERENCE TO RELATED APPLICATIONS

This application is the U.S. National Stage of PCT/FR2021/051976, filed Nov. 9, 2021, which in turn claims priority to French patent application number 2011540 filed Nov. 10, 2020. The content of these applications are incorporated herein by reference in their entireties.

The present invention relates to the field of glazed units of the type clamped in a frame, which can be found mainly in the aeronautical and railway industries. Two main technologies are used in aeronautical glazed units, a clamped-type mounting and a bolted-type mounting.

Clamped-type mounting exhibits, during the pressurization of the apparatus (aircraft) and optionally in the event of a breakage of one or two plies of structural glass (single or double "failsafe"), a risk of the glazed unit coming loose from the airplane structure, possibly resulting in depressurization of the cabin associated with the leak between the seal and the airplane structure.

At present, in the majority of airplane structures, the contact region between the windowpane retainer and the window seal is located in the same plane of shape ($\alpha=0$), that is, a plane parallel to the main surface of the glazed unit in contact with the external atmosphere. At the bottom, the contact region between the seal of the glazed unit and the airplane structure has a positive or even zero angle $\beta$, that is to say in the latter case that this contact region is parallel to the main surface of the glazed unit in contact with the internal volume of the aircraft.

The invention therefore aims to limit the peripheral sliding of a glazed unit that is clamped in its mounting structure (airplane fuselage, etc.) in order to guarantee that the glazed unit does not come loose from the structure. This aim is achieved by the invention, which relates to an assembly of a laminated glazed unit and the peripheral seal thereof, the laminated glazed unit consisting of a transparent structural block comprising at least one sheet, and optionally an external transparent protective sheet, wherein the structural block overhangs relative to the protective sheet, the peripheral seal having a first spacer part between the overhanging part of the main surface of the structural block closest to the protective sheet, and a windowpane retainer for clamping the laminated glazed unit in order to attach same to the mounting structure thereof, the peripheral seal having a second spacer part between the overhanging part of the main surface of the structural block furthest from the protective sheet, and the mounting structure, characterized in that at least one of the contact surface between said first spacer part and the windowpane retainer and/or between said second spacer part and the mounting structure approach(es) the structural block, from the edge of the latter toward the central part thereof.

In the present application, any mention of an overhanging part of the structural block refers to a projection of the structural block relative to the protective sheet if one exists. In the absence of a protective sheet, such a statement must be considered to simply refer to the edges of the structural block, these edges serving to clamp the glazed unit.

By virtue of the invention, the clamping surfaces of the glazed unit form a narrowing in the direction from the edges of the glazed unit toward the central part thereof. This arrangement is exploited in the event of a deformation of the glazed unit, which can be caused by the breakage of one or all of the structural sheets (also referred to as structural plies), limiting or even eliminating the sliding of the periphery of the glazed unit on its mounting structure, in such a way as to eliminate any risk of the glazed unit coming loose from the structure.

Preferably, at least one of the contact surface between said first spacer part and the windowpane retainer and/or between said second spacer part and the mounting structure form(s) with the main surface of the structural block which is/are closest to same, an angle comprised between $-1$ and $-40°$. The value of this angle is defined so that depending on the seat width, the external dimension of the seal (its thickness toward the edge of the glazed unit) is greater than the internal dimension of the seal on the glazed unit side (that is, the total thickness thereof including the thickness of the structural block, toward the central part of the glazed unit), even when the seal is compressed.

These negative angles can be obtained, for example, by the shape of the impression of the injection mold or of the extrusion, co-extrusion or lamination die used to form the peripheral seal on the one hand, and by machining the windowpane retainer and the mounting structure on the other hand.

Preferably, at least one of the contact surface between said first spacer part and the windowpane retainer and/or between said second spacer part and the mounting structure is/are planar or has/have at least one radius or one curve.

Preferably, the structural block comprises two sheets bonded to one another by an adhesive interlayer; these two sheets are referred to as structural sheets (optionally structural plies) and provide the mechanical strength and resistance of the glazed unit.

Preferably, the structural block is bonded to the protective sheet by an adhesive interlayer.

Preferably, each sheet of the structural block and the protective sheet consist, independently of one another, of mineral glass such as soda-lime, aluminosilicate or borosilicate glass, optionally hardened, thermally tempered, or chemically strengthened, or of transparent polymer material such as poly(methyl methacrylate) (PMMA), polycarbonate (PC), polyethylene terephthalate (PET) or polyurethane (PU). When one of these sheets constituting a free surface of the laminated glazed unit, that is, the protective sheet in contact with the external atmosphere, or the structural sheet in contact with the internal volume of the aircraft or the train, is made of a polymer material such as PC, its free surface is advantageously provided with an anti-scratch coating or varnish of the polysiloxane, hydrophilic, hydrophobic type.

Preferably, said adhesive interlayers consist, independently of one another, of polyvinyl butyral (PVB), thermoplastic polyurethane (TPU), or ethylene-vinyl acetate (EVA) copolymer.

Commonly, the laminated glazed unit according to the invention comprises a heating electrically conductive layer connected to an electrical current source by busbars arranged on two opposite sides of the glazed unit. This may be an anti-icing layer on the main face inside the laminated structure, of the sheet (especially protective) intended to be in contact with the external atmosphere when in the mounted position, or an anti-misting layer on the main face inside the laminated structure, of the sheet (especially structural) intended to be in contact with the internal volume of the air or rail vehicle when in the mounted position. The anti-icing or anti-misting layer consists of tin-doped indium oxide (or indium tin oxide, abbreviated to ITO), metal such as silver, or equivalent.

Preferably, the peripheral seal is made of elastomeric polymer material, especially injectable or implemented by extrusion, such as silicone, polyurethane (PU), polysulfide elastomer.

Preferably, a metallic profile is inserted into the peripheral seal, covering the regions to which it conforms with a peripheral strip of the free surface of the protective sheet, the edge faces of the latter and the adhesive interlayer bonding the latter to the structural block, and the overhang of the main surface of the structural block closest to the protective sheet. This metallic profile, commonly referred to as "Z-section" profile, constitutes a sealing barrier; it has the function of preventing any moisture from entering the laminated glazed unit.

Preferably, a stiffening wedge is inserted into said second spacer part of the peripheral seal between the overhanging part of the main surface of the structural block furthest from the protective sheet, and the mounting structure (airplane fuselage, train body, etc.). This wedge can be made of a composite and solid material, or consist of a hollow metallic profile.

The invention also relates to the application of an assembly of a laminated glazed unit and the peripheral seal thereof, as previously described, to a clamped-type glazed unit in the field of aeronautics or railways.

The invention will be better understood in the context of the following description of the appended drawings, in which FIG. 1 is a cross sectional view of a glazed unit of the state of the art.

FIG. 2 schematically depicts in cross section the glazed unit of FIG. 1.

FIG. 3 is a schematic cross sectional depiction of a first embodiment of the invention.

FIG. 4 is a schematic cross sectional depiction of a second embodiment of the invention.

FIG. 5 is a schematic cross sectional depiction of a third embodiment of the invention.

In FIG. 1, an aeronautical glazed unit 1 consists of a structural block 2 and an outer protective sheet 7 made of chemically strengthened aluminosilicate glass with a thickness comprised between 0.5 and 5 mm.

The structural block 2 protrudes, overhanging relative to the protective sheet 7, to which it is bonded by means of a layer 6 of polyvinyl butyral (PVB) or thermoplastic polyurethane (TPU) with a thickness comprised between 0.2 and 10 mm.

The structural block 2 consists of a sheet 3 of soda-lime-silica float glass with a thickness comprised between 1 and 30 mm, and a sheet 5 of polycarbonate (PC) with a thickness comprised between 1 and 30 mm bonded to one another by means of a layer 4 of TPU with a thickness comprised between 0.2 and 4 mm. Alternatively, when the sheet 5 is made of mineral glass, the adhesive layer 4 is made of PVB.

The rounded edges of the structural sheets 3 and 5 are protected by covering with elastomer strips 8, commonly referred to as bumpers, which dampen/absorb shocks.

The complex edge of the laminated glazed unit 1 is covered by a peripheral seal 11 consisting essentially of an elastomeric polymer material such as silicone, polyurethane, polysulfide or the like.

A Z-section metallic profile 14 is integrated into the peripheral seal 11, in the region of a peripheral strip of the free surface of the protective sheet 7, of the edge face of the latter 7 and of the PVB layer 6, and a peripheral strip of the structural sheet 3, overhanging from the protective sheet 7. The Z-section profile 14 prevents moisture from entering the laminated structure 1.

Furthermore, the lower part of the peripheral seal 11, of maximum thickness, accommodates a stiffening wedge 15 consisting of a hollow aluminum profile.

The laminated glazed unit 1 is attached to the fuselage of an airplane 22, by clamping between the latter 22 and a windowpane retainer 21 attached, especially by bolting, to the fuselage 22. The clamping is carried out with insertion of the peripheral seal 11, more precisely of two remarkable parts of the latter 11: a first spacer part 12 between the overhanging part of the main surface of the structural block 2 closest to the protective sheet 7, and the windowpane retainer 21, on the one hand, and a second spacer part 13 between the overhanging part of the main surface of the structural block 2 furthest from the protective sheet 7, and the fuselage 22, on the other hand. The contact surface between the first spacer part 12 and the windowpane retainer 21 is parallel to the main surface of the laminated glazed unit 1, with which it therefore forms an angle of zero. The contact surface of the second spacer part 13 with the fuselage 22 is substantially planar, forming with the main surface of the laminated glazed unit 1 an open angle, defined herein, by convention, as positive. In the event of a deformation of the laminated glazed unit 1, due for example to the pressurization of the apparatus under normal operating conditions or caused, for example by a breakage of one of the two structural sheets 3 and 5, or even of both, this open configuration of the two clamping surfaces is conducive to the peripheral sliding of the laminated glazed unit 1 relative to the fuselage 22 and to the windowpane retainer 21. The glazed unit is then likely to come loose from the fuselage, leading in such a case to a risk of depressurization of the aircraft cabin.

FIG. 2 schematically depicts a situation in which the two clamping surfaces are planar and define two angles of zero relative to the laminated glazed unit 1. This configuration, like that of FIG. 1, promotes the undesired peripheral sliding of the laminated glazed unit 1 in its mounting structure.

In FIG. 3, one of the two clamping surfaces, the contact surface between the peripheral seal 11 and the windowpane retainer 21, is planar and approaches the structural block 2 in the direction from the edge toward the central part of the latter 2. This contact surface forms, relative to the structural block, an angle defined by convention as negative. The other clamping surface, the contact surface between the peripheral seal 11 and the fuselage 22, is planar and parallel to the structural block 2.

In FIG. 4, conversely, it is the contact surface between the peripheral seal 11 and the fuselage 22 that is planar and forms relative to the structural unit 2 an angle defined hereinbefore as negative, while the contact surface between the peripheral seal 11 and the windowpane retainer 21 is planar and parallel to the structural block 2.

In FIG. 5, it is the two clamping surfaces that define a negative angle relative to the structural block 2. In the three embodiments in accordance with the invention of FIGS. 3, 4 and 5, one of the clamping surfaces or both approach the structural block 2 in the direction from the edge toward the central part of the latter 2, that is to say, forming a negative angle relative to same 2, so that the external dimension (total thickness) from the peripheral seal 11 toward the edge of the structural block 2 is greater than the internal dimension (total thickness, comprising that of the structural block 2)

thereof toward the central part of the structural block 2. The technical aspect of the invention is likely to reduce the peripheral sliding of the structural block 2 in its mounting structure 22, when it 2 is deformed, in such a way as to prevent the structural unit 2 from coming loose from the structure 22 and from the windowpane retainer 21.

The invention claimed is:

1. An assembly comprising:
    a laminated glazed unit comprising a transparent structural block comprising at least one sheet, the structural block comprising opposed first and second main surfaces and an edge,
    a peripheral seal surrounding the edge of the structural block, the peripheral seal including:
        (i) a first spacer part arranged between an overhanging part of the first main surface of the structural block and a windowpane retainer and
        (ii) a second spacer part arranged between the second main surface of the structural block and a mounting structure,
    wherein the windowpane retainer and the mounting structure are configured to clamp the laminated glazed unit with the peripheral seal therebetween, and
    wherein at least one contact surface selected from (a) a contact surface between the first spacer part and the windowpane retainer and (b) a contact surface between the second spacer part and the mounting structure is inclined toward the structural block along a direction from the edge toward a central part of the structural block such that said at least one contact surface and the structural block converge toward one another in said direction, the inclination defining a negative angle between −1° and −40° with an adjacent main surface of the structural block.

2. The assembly according to claim 1, wherein each of the contact surface between said first spacer part and the windowpane retainer, and the contact surface between said second spacer part and the mounting structure, forms with the adjacent main surface of the structural block an angle comprised between −1 and −40°.

3. The assembly according to claim 1, wherein the at least one contact surface between said first spacer part and the windowpane retainer and/or between said second spacer part and the mounting structure is/are planar or has/have at least one radius or one curve.

4. The assembly according to claim 1, wherein the structural block comprises two sheets bonded to one another by an adhesive interlayer.

5. The assembly according to claim 4, wherein the adhesive interlayer consists of polyvinyl butyral (PVB), thermoplastic polyurethane (TPU) or ethylene-vinyl acetate (EVA) copolymer.

6. The assembly according to claim 1, wherein the structural block is bonded to the protective sheet by an adhesive interlayer.

7. The assembly according to claim 1, wherein each of the at least one sheet of the structural block, and the protective sheet consist, independently of one another of mineral glass or of transparent polymer material.

8. The assembly according to claim 7, wherein the mineral glass is soda-lime, aluminosilicate or borosilicate glass, and the transparent polymer material is poly (methyl methacrylate) (PMMA), polycarbonate (PC), polyethylene terephthalate (PET) or polyurethane (PU).

9. The assembly according to claim 7, wherein the mineral glass is hardened, thermally tempered, or chemically strengthened.

10. The assembly according to claim 1, wherein the peripheral seal is made of elastomeric polymer material.

11. The assembly according to claim 10, wherein the elastomeric polymer material is injectable or implemented by extrusion.

12. The assembly according to claim 11, wherein the elastomeric polymer is silicone, polyurethane (PU), or polysulfide elastomer.

13. The assembly according to claim 1, comprising a metallic profile that is inserted into the peripheral seal.

14. The assembly according to claim 1, wherein a stiffening wedge is inserted into the second spacer part of the peripheral seal between the the second main surface of the structural block and the mounting structure.

15. A method comprising providing an assembly of a laminated glazed unit and the peripheral seal thereof according to claim 1 to a clamped-type glazed unit of an aircraft or railway vehicle.

16. The assembly according to claim 1, wherein the laminated glazed unit further comprises an external transparent protective sheet, and wherein the structural block overhangs relative to the external protective sheet.

* * * * *